INVENTORS
HOWARD S. CANNON,
PHILIP F. CATALANO,
JOHN D. GLOMB &
ROGER M. O'NEILL

BY Mason, Porter, Diller & Brown
ATTORNEYS

May 12, 1970     H. S. CANNON ET AL     3,511,957
DEVICE FOR IMPROVING EFFICIENCY OF RADIO-FREQUENCY WELDING
Filed Feb. 2, 1965     2 Sheets-Sheet 2
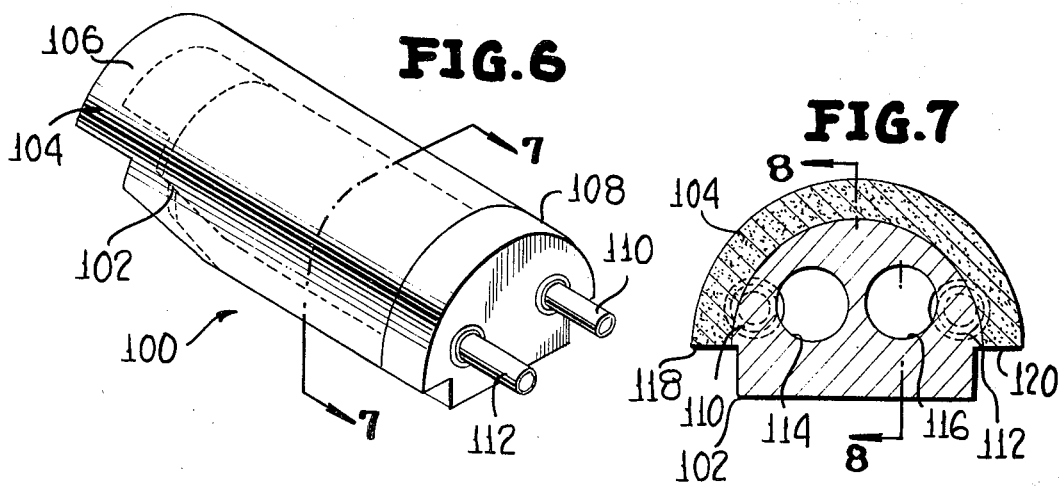
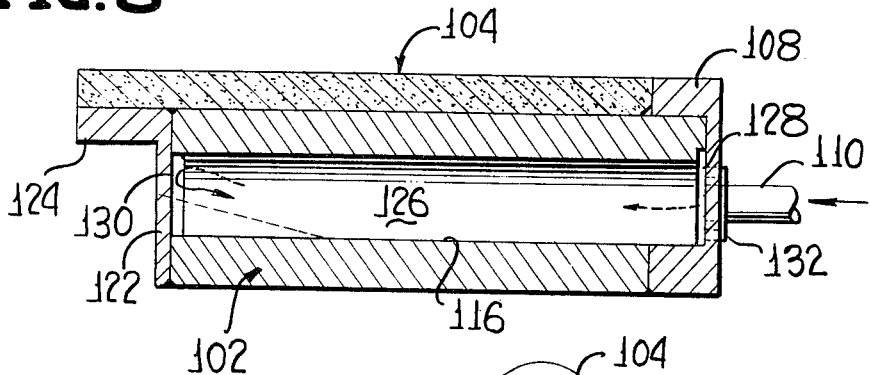
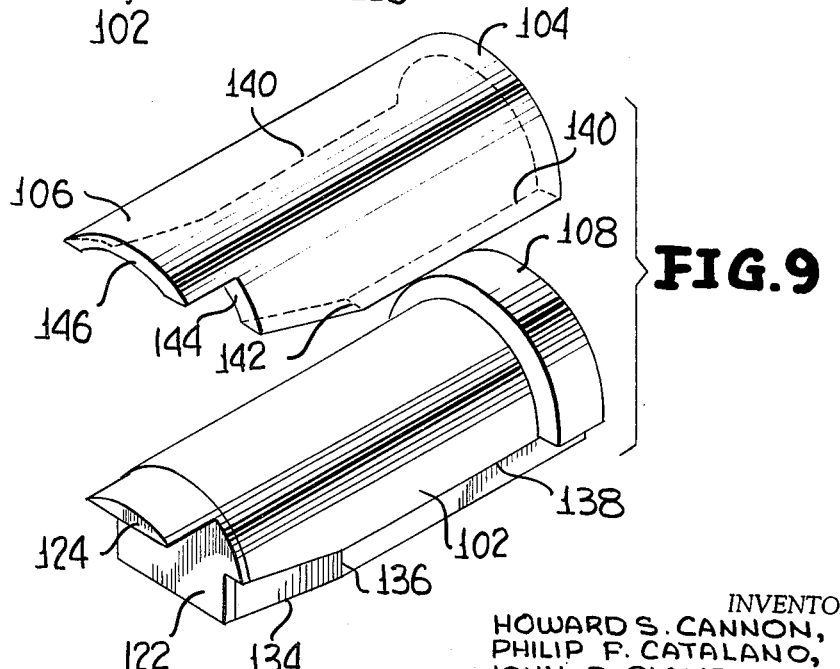
INVENTORS
HOWARD S. CANNON,
PHILIP F. CATALANO,
JOHN D. GLOMB &
ROGER M. O'NEILL
BY Mason, Porter, Diller & Brown
ATTORNEYS

United States Patent Office 3,511,957
Patented May 12, 1970

3,511,957
DEVICE FOR IMPROVING EFFICIENCY OF RADIO-FREQUENCY WELDING
Howard S. Cannon, Evergreen Park, Phillip F. Catalano, Chicago, John D. Glomb, South Holland, and Roger M. O'Neill, Oaklawn, Ill., assignors to Continental Can Company, Inc., New York, N.Y., a corporation of New York
Filed Feb. 2, 1965, Ser. No. 429,726
Int. Cl. B23k *13/02*
U.S. Cl. 219—8.5                                32 Claims

ABSTRACT OF THE DISCLOSURE

An impeder device for improving the efficiency of radio-frequency welding of continuous strip metal is disclosed. The impeder device includes a housing and a layer of high permeability magnetic material mounted within a recess in the horn about which the strip material is brought into edge-to-edge engagement for the welding together of the edges thereof. A magnetic field terminator block and heat sink is provided at the upstream end of the layer of magnetic material and the housing includes fluid passages for the conduction of cooling fluid into cooling relation with the layer of magnetic material. Sintered ferrites and particulated ferro-magnetic material in a resinous base are suitable for the formation of the layer of magnetic material which is constructed to provide a surface conforming to the interior surface of the strip edge portions to be joined.

---

This invention relates to an impeder device having a high magnetic permeability for improving the efficiency of radio-frequency welding of continuous strip metal. More specifically, the invention relates to a fluid-cooled impeder which is designed to be placed in the top portion of a horn about which a tubular shape is formed in a continuous welding line in order to provide a low reluctance path for the magnetic flux generated by the radio-frequency induction coil surrounding the horn and the tubular formed metal.

The impeder concentrates the magnetic flux field set up by the RF induction coil and thereby impedes the induced current flow in sections of the tubular strip in which heating is not desired. By increasing the impedance of such extraneous paths, the impeder causes the concentration of induced current in those portions of the moving tubular metal where heating is desired for attaining welding temperatures.

Metals, particularly aluminum, in both light-gauge (0.0066 inch thickness) and heavier gauge may be welded by lap or blap welds with increased speeds and decreased power requirements utilizing the impeder device of the present invention.

Some of the impeder members suggested for use in continuous welding lines have been constructed of a solid core of ferromagnetic material, e.g., iron cores. A cylindrical shaped impeder member contained within a portion of the horn about which the metal strip is formed has been used together with a cooling fluid. Difficulty is encountered in such constructions with maintaining the temperature of the impeder members below the Curie temperature, notwithstanding the presence of a coolant. Above the Curie temperature the phenomena of ferromagnetism disappears and the substance becomes merely paramagnetic.

Another statement with respect to the employment of impeder members in continuous welding lines is that such are unnecessary if the ratio of the thickness of the metal being welded to the reference depth of the current or the current penetration depth in the metal is less than 3. When the conditions are considered correct for the presence of an impeder element a solid core of a ferrimagnetic material has been proposed. Such materials possess a permeability greater than unity at room temperature and contain ferrous iron. An example of such material is magnetite ($Fe_3O_4$) which exhibits anti-parallel alignment in a magnetic field. A frequently used class of ferrimagnetic materials consists of ceramic ferrites, which are made by mixing magnetite or ferrous ferrite with other metal oxides, often of the transition metal group, and sintering the resulting mixture at high temperature and pressure. As these materials are extremely hard and brittle ceramics, they are difficult to machine or to form into particular shapes.

Another form of such impeder elements has been a ring-shaped core of ferrimagnetic material which may have fluid cooling conduits arranged therein. This ring-shaped core is positioned coaxially with the induction coil which provides the heating of the continuous metal tubing being welded and hence tends to form a coupling core for the surrounding induction coil and usually extends for only a very short distance along the interior of the metal tubing being formed prior to welding. A manifest impediment with such ring-shaped impeder cores is the difficulty in cooling them. The provision of internal coolant passages within the material is made difficult due to the fact that they must be sintered from their component metallic oxides and are not readily joined together for the formation of internal passages. They are extremely difficult to machine and hence passages cannot be later machined within the material. If such ferrimagnetic materials are to be employed on a commercial basis they must be employed in the form of simple shapes which are easily manufactured during the sintering operation.

In addition to being constructed from materials lacking the above desirable properties, impeder structures used in continuous welding lines have not been geometrically arranged to concentrate the current inducted in those portions of the positioned material which must be heated to welding temperatures. The mere placement of impeder material within and about the welding horn is an insufficient answer to the problems which have prevented the RF line welding of thin metal stock. Specific geometric shape and positioning, requiring machinability, are necessary.

Various cooling means have been arranged with respect to impeder members and various support structures have been suggested by the prior art. Most supporting structures have been designed only to specifically situate the impeder members within the forming horn. Little consideration has been given to the requirement of controlling the concentration of the magnetic field intensity created by the radio-frequency induction coil or other heating device, such as electrode shoes. The back-magnetic flux field induced within the impeder member itself must be reduced and the flow of heat between the impeder member and the surrounding horn metal must be eliminated. Supporting members which merely connect the impeder member to the forming horn do not provide for either of these two requirements. While the efficiency of continuous tube welding in heavy gauge metals is somewhat increased by the impeders set out in the prior art, the various factors set out above have not been taken into consideration in order to provide a commercially feasible welding line for thin gauge metal strip material.

For impeder structures, low electrical conductivity is desirable in order to prevent eddy current flow and thus power loss. High saturation flux density, magnetic permeability, Curie temperature, thermal conductivity and good ductility and machinability are other properties which, when present as a group, identify an ideal impeder substance. Presently employed impeder materials do not have all of the desirable properties represented by adequate values to enable their use in special employments.

The common ferromagnetic materials, while having high magnetic permeability, also have high electrical conductivity which allows eddy current flow and, hence, power loss, as well as excess heating.

The sintered ferrite materials provide high permeability and relatively low electrical conductivity; however, there is sufficient eddy current flow in such impeder materials to present heating problems which then necessitate special cooling techniques. The relatively low Curie temperature of such ceramic ferrite materials makes the requirement of removing the heat generated imperative so that the high permeability will remain. These ceramic ferrites are also characterized by low thermal conductivity which then necessitates the efficient removal of the heat generated by the eddy currents. In order to remove the generated heat, thin cross-sections of the material are necessitated. Also, because of the relatively low saturation flux density of the ceramic ferrites, a sufficient thickness of the material must be provided to prevent saturation at high magnetic flux intensity.

The above problems with respect to the magnetic materials available have been overcome by providing an impeder material consisting of a mixture of particulate ferromagnetic material with a resinous binder. The specific particulate materials are water-atomized iron powder and carbonyl processed iron powders of small particle size. The impeder material may be cast or die pressed into particular geometric shapes which, when used in association with an RF welding line, permit greater welding speeds and efficiency. This ferromagnetic impeder material has a relatively high thermal conductivity so that it may be cooled by contacting one surface of an impeder shape by a water cooled metallic support member. The material also has good machinability by which specific intricate shapes may be manufactured therefrom after casting or die pressing so that particular geometric arrangement of the impeder may be formed with respect to the associated horn.

The impeder device of the present invention consists of a magnetic material layer which is arranged in a surface conforming to the curved surface formed by the strip material when positioned for welding, a support means for the layer and a cooling means for removing the heat generated within the layer by the radio-frequency alternating magnetic field. The cooling means may consist of fluid coolant channels within the support means or may consist of fluid coolant channels arranged within a non-magnetic housing which encloses both the magnetic material layer and the support means for the layer. In the description and claims the term magnetic material is intended to refer to those materials which exhibit gross magnetism in a magnetic field. That is, those materials which are classed as ferromagnetic or ferrimagnetic. When the latter type of magnetic material is employed the enclosed housing form of the impeder is employed in order to give sufficient cooling to the ferrimagnetic material which has a low thermal conductivity.

It is, therefore, an object of the present invention to provide the improvement in a radio-frequency welding apparatus of the type which has a heat generating means and a horn over which opposite edges and edge portions of continuous strip material are positioned for welding one to another which consists of an impeder device having a magnetic material layer arranged in a surface conforming to the curved surface formed by the strip material when positioned for welding, and a support means for said layer and a cooling means for removing the heat generated within said layer. The impeder device is at least partially housed in a recess formed in the horn of the welding apparatus and is positioned within the horn so that the magnetic material layer lies immediately under the converging V-configuration of the strip material positioned for welding.

In line with the above object the magnetic material layer may be formed from either a mixture of particulated ferromagnetic material and a resinous binder or a ferrimagnetic material formed by sintering ferrous ferrite and transition metal oxides into a ceramic solid.

The impeder device of the above object may have a magnetic field intensity terminator and heat sink block affixed to the upstream end thereof to provide for magnetic shielding and to remove heat generated therewithin.

The cooling means of the above object may be formed by an exterior non-magnetic housing surrounding the magnetic material layer and its support means in order to form fluid flow channels both above and below the layer and its associated support or may consist of fluid flow channels connected to respective fluid ports in the support means. The former cooling means is preferred when using the ferrimagnetic materials mentioned above.

Yet another object of the present invention is to provide the improvement in a radio-frequency welding apparatus, as above, of an impeder device which may be removably housed in a recess in the horn. The device has a magnetic material layer arranged in a surface conforming to the curved surface formed by the strip material when positioned for welding and has a support means for said layer, both of which are positioned within a non-magnetic fluid-tight housing in such a fashion that upper and lower channels are created between the housing and the layer and its associated support means. A coolant fluid is circulated both above and below the two elements encased in the non-magnetic housing for removing the heat generated therewithin. The impeder device is arranged within the recess in the horn so that it is immediately under the converging V-configuration formed by the positioned strip material. The upstream end of the impeder device may consist of a magnetic field intensity terminator and heat sink block which is in fluid-tight engagement with said housing and has first and second fluid ports therein for the circulation of the coolant fluid. The upper surface of the non-magnetic housing, the magnetic material layer, and its associated support are all positioned in a surface conforming to the curved surface formed by the strip material when positioned for welding to attain the particular advantages of the present invention.

The above object may be attained by providing a magnetic material layer consisting of individual elements of sintered ferrous ferrite and a transition metal oxide.

Yet another object of the present invention is to provide the improvement in a radio-frequency welding apparatus as in the above objects wherein the magnetic material layer is supported by a support means which has fluid coolant channels therewithin connected to first and second fluid ports for the circulation of a coolant fluid for the extraction of generated heat from at least one side of the magnetic material layer. The support means of this object may have a magnetic field intensity terminator and heat sink block attached to the upstream end thereof for the purposes hereinafter set out.

Yet another object is to provide an improved impeder member for use with a radio-frequency welding apparatus which is positioned within the magnetic field generated by the heating means which is constructed of a low electrical conductivity material and a high magnetic permeability material. A suitable material has been found to be powdered alpha-iron produced by either the water atomized process or the carbonyl process, mixed in a proportion in the range of 5:1 to 20:1 with a polyester resin.

The magnetic field intensity terminating and heat sink block of the above objects may be advantageously constructed of a high copper alloy or other good electrical and thermal conductivity material which can be used to form a fluid-tight seal with the other impeder elements.

The radio-frequency current heating means of the above objects may be either an induction coil wound about said horn and spaced therefrom or electrode welding shoes contacting the edge portions of the strip material as it passes toward the forgoing rolls, both connected to a source of radio-frequency current.

Yet another object of the present invention is to provide a radio-frequency welding apparatus which includes means to continuously feed strip material for welding and a horn about which the strip material may be positioned for welding and includes forging rolls for forming a line of weld between the edge portions of the metal strip, with the improved structure of a radio-frequency induction coil wound about said horn spaced therefrom, a magnetic material layer positioned within the cross section of said forming horn and underlying the converging V-configuration of the strip material to concentrate the magnetic field intensity generated by said induction coil. The magnetic layer is positioned from a plane immediately upstream from the forging rolls to a plane upstream past the opposite end of the induction coil. The magnetic material layer is formed of a ferromagnetic or ferrimagnetic material arranged in a curved surface conforming to the curved surface formed by the strip material when positioned for welding. A magnetic field intensity terminator and heat sink block may be affixed to the end of the layer to terminate the magnetic flux and to act as a heat sink. A non-magnetic housing may cooperate with the magnetic field intensity terminator and heat sink block to form a fluid-tight enclosure within which a coolant material may be circulated to cool said magnetic material layer.

The non-magnetic housing and the magnetic field intensity terminator and heat sink material of the above object preferably cooperate to form a unit shaped on the bottom to fit the contour of the recess of the horn and curved on the topside thereof to complete the circular cross-section of the horn.

The impeder and magnetic field intensity terminator block apparatus of the instant invention will be described in greater detail and will be more readily understood by reference to the following description and claims taken in conjunction with the accompanying drawings, in which:

FIG. 6 is a perspective view of a modification of the impeder device shown in FIG. 3;

FIG. 7 is a cross-sectional view of the impeder device of FIG. 6 taken on the line 7—7;

FIG. 8 is a longitudinal cross-sectional view of the impeder device shown in FIG. 6 taken on line 8—8 of FIG. 7; and FIG. 9 is an exploded perspective view of the impeder device shown in FIG. 6.

Figure 1:
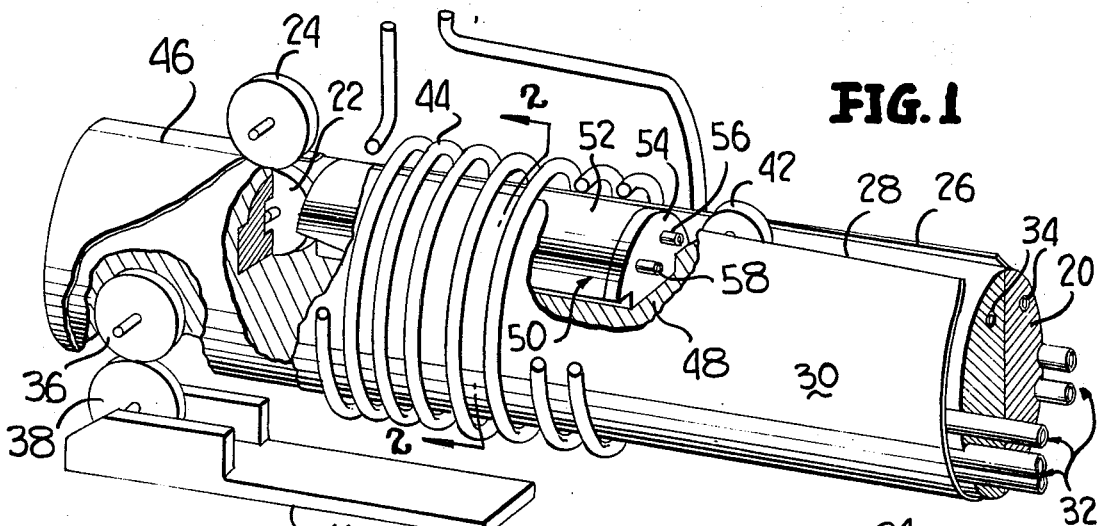
FIG. 1 is a perspective view of the apparatus of the instant invention with parts therof shown in sectional view.

Referring now to FIG. 1, a portion of a forming horn 20 is shown together with forging rolls 22 and 24 which are positioned at the apex of the "V" configuration formed by the converging edge portions 26 and 28 of the sheet material 30. In addition to bottom forging roll 22 and top forging roll 24, forming horn 20 includes a conventional fluid entry and/or exit conduit assembly 32 for supplying lubricant and coolant liquids to the bearings in various rolls such as bottom forging roll 22 as well as supplying material for an inside lacquer strip to cover the inside weld seam.

Forming horn 20, in accordance with the instant invention, includes a pair of fluid lines 34 in the upper portion. A top support roll 36 is shown enclosed within a portion of forming horn 20 and a cooperating lower support roll 38 is shown connected to a supporting means 40.

Supporting rolls 36 and 38 are part of the means for advancing the tubular formed sheet material 30 over the forming horn 20 and maintaining the tubular form.

A parting or spacing roll 42 is shown located in the uppermost portion of forming horn 20 and positioned to a spacer member for strip edge portions 26 and 28. The strip material 30 advances over forming horn 20 and in a downstream direction toward forging rolls 22 and 24. The metal edge portions 26 and 28 are heated by the radio-frequency induction coil 44 wound about forming horn 20 and spaced therefrom a sufficient distance to accommodate the passage of tubular formed strip material 30. Induction coil 44 is connected to a source of radio-frequency current (not shown). The apex of the "V" configuration formed by the edges or edge portions 26 and 28 is located immediately between forging rolls 22 and 24. The heated edge portions are brought together between forging rolls 22 and 24 and a line or weld 46 is formed. The resulting product is a continuously formed tubular structure having a single weld seam therein. By proper tensioning of the tubular formed material 30 and by positioning the edge portions 26 and 28 with respect to one another, either a lap or a blap weld seam may be formed. In both types of weld seam it is necessary that the forging rolls immediately contact the joined edge portions at or in close proximity, downstream, of the apex of the "V" configuration.

Forming horn 20 is constructed with a recess 48 in the upper portion thereof immediately underlying the helical induction coil 44. An impeder device 50 rests in recess 48 and extends within said recess to the close proximity of forging rolls 22 and 24. The impeder device 50 extends completely through the length of induction coil 44 and immediately underlies the edge portions 26 and 28 and extends from a point close to spacing roll 42 to within a short distance from forging rolls 22 and 24, and therewith extends under the converging "V" configuration up to the close proximity of the apex.

Impeder device 50 has a non-magnetic housing 52 and a magnetic field intensity terminator and heat sink end block 54 affixed to housing 52 at the upstream end thereof. The connection between housing 52 and block 54 is watertight to provide for circulation of a coolant fluid through the housing. A first fluid port 56 extends through block 54 and into communication with the interior of the housing 52 while a second fluid port 58 extends through block 54 to provide an exit for the coolant fluid within housing 52. The flow of the coolant fluid may be reversed so that port 58 becomes the entry port and port 56 becomes the exit port.

Figure 2:
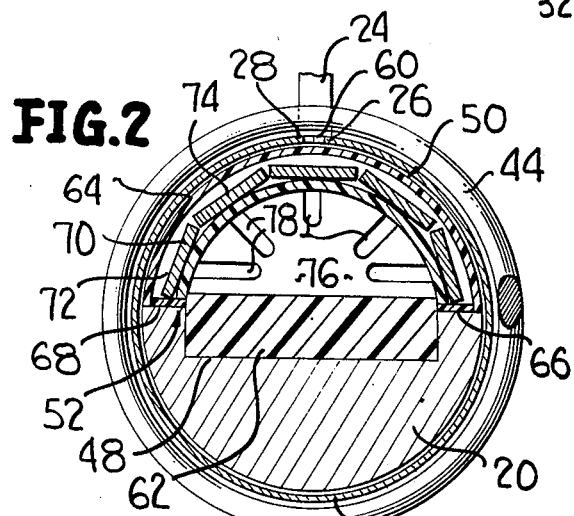
FIG. 2 is a cross-sectional view of the apparatus of FIG. 1 taken on the line 2—2.

Impeder device 50 is more clearly shown by the enlarged cross-sectional view of FIG. 2 in which the forming horn 20 is positioned within induction coil 44. Recess 48 in forming horn 20 provides support for impeder device 50. Strip material or the tubular formed sheet material 30 is shown positioned around the horn and out of contact with horn 20 and the associated impeder device 50. Edges or edge portions 26 and 28 are seen converging to the apex 60 which is immediately under forging roll 24.

Non-magnetic housing 52 has a bottom panel or portion 62 connected to a semi-cylindrical covering or top portion 64 through horizontal side skirts 66 and 68. The channel-shaped recess 48 provides a stable support for impeder device 50 due to the configuration of the bottom panel 62 and horizontal side skirts 66 and 68. Within housing 52 a magnetic material layer 70 is supported by a semi-cylindrical support member 72. The magnetic material layer 70 is composed of individual magnetic material elements 74, but may be a continuous unitary element, if desired. The employment of individual thin rectangular elements for the magnetic material is facilitated by the availability of sintered ceramic ferrite strips in the present market.

Impeder device 50 has a downstream end 76 composed of a similar non-magnetic material to that from which bottom panel 62, top portion 64 and horizontal side skirts 66 and 68 are constructed. Fluid flow channels 78 are shown cut into the material of end panel or wall 76 and may be molded and placed simultaneously with the construction of end panel or wall 76.

Figure 3:
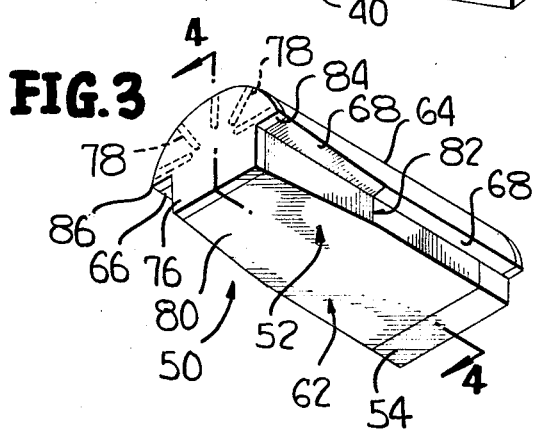
FIG. 3 is a perspective view taken from the underside of the impeder device of the present invention.

FIG. 3 shows end panel 76 in fluid-tight engagement with the non-magnetic housing 52, which is in turn in fluid-tight engagement with the upstream end block 54. Fluid flow channels 78 may be seen on the interior wall of end panel 76. Bottom panel 62 has a tapered downstream end 80 which decreases in width from angular connection 82 to the connection of housing 52 to end panel 76. Of course, the bottom panel 62, side skirts 66 and 68 and top panel 64 may be integrally molded as a unitary piece or separately manufactured and assembled.

Side skirts 66 and 68 slope upwardly from angular connection 82 into engagement with the horizontally extending side portions 84 and 86 of end panel 76. The overall configuration of the undersurface of impeder device 50 is such that it may be secured in position within recess 48 which provides a stable support therefor. That is, recess 48 is configured in a manner so that the reduced tapered portion 80 of bottom panel 62 and the elevated side skirts 66 and 68 engage the recess to lock the impeder device 50 in place in horn 20.

Figure 4:
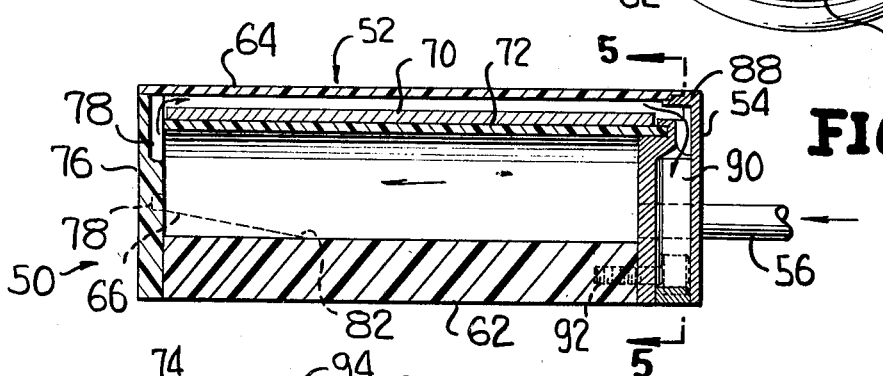
FIG. 4 is a cross-sectional view of the impeder device of FIG. 3 taken on the line 4—4.

By FIG. 4 the flow of coolant fluid through impeder device 50 may be understood. Fluid coolant is forced into port 56 which extends through end block 54 and into communication with the interior of non-magnetic housing 52. Semi-cylindrical support member 72 and bottom panel 62 form a fluid flow channel for the passage of the fluid coolant toward the downstream end panel 76. The fluid coolant then passes through fluid channel 78 and onto the upper surface of magnetic material layer 70 and flows therealong to the upstream end of the magnetic material layer 70 and then into a semi-cylindrical receiving port 88. This port is then connected to an internal channel 90 which is provided with a connection to the second fluid port 58, of FIG. 1. The raised side skirt 66 of the impeder device is shown extending from angular connection 82 upwardly to end panel 76. Top panel 64 is shown in a stepped engagement to magnetic field intensity terminating and heat sink block 54 and in an overlying relationship to downstream end panel 76. The bottom panel 62 is securer to block 54 by a threaded securing means 92. All connections of the various parts of impeder device 50 are of a fluid-tight type in order to retain coolant fluid.

Magnetic material layer 70 may be affixed to support member 72 by a chemical securing means such as glue or may be unsecured as the cooperative spacing of support member 72 and top panel 64 prevent relative movement of the magnetic material layer 70 with respect to the other fixed parts of the impeder device.

Figure 5:
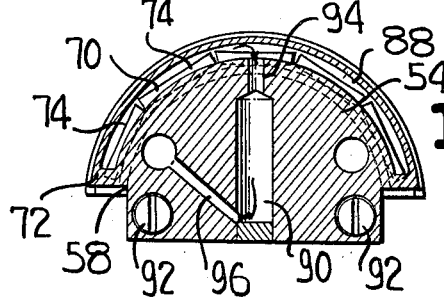
FIG. 5 is a cross-sectional view of the magnetic field intensity terminator and heat sink block of the impeder device of FIG. 4 taken on line 5—5.

FIG. 5 shows the flow path of the fluid coolant from semi-cylindrical port 88 into internal channel 90 which has a reduced upper portion 94. The fluid is then caused to flow into exit channel 96 and then into fluid port 58 which extends through the block 54 to connect with exit channel 96. The magnetic material layer 70 is shown consisting of individual elements 74, as in FIG. 2. Threaded securing means 92 for securing block 54 with the bottom panel 62 of FIGS. 2–4 are shown. Support member 72 is shown by dotted lines under the magnetic material layer 70.

The material from which the magnetic layer 70 is constructed may be either a ferromagnetic material or a ferri-magnetic material, that is, a material which exhibits gross magnetism when placed in a magnetic field of sufficient intensity. Many of the numerous ferromagnetic materials are undesirable when used for this magnetic layer associated with the radio-frequency induction coil 44. Common transformer core iron has a high electrical conductivity and, hence, when used for the magnetic layer 70, does not have a high volume resistivity by which eddy currents are prevented from flowing in the iron. Therewith, the iron attains a very high temperature which is difficult to control even with the cooling fluid passing under and over the thin section. Associated with this heat buildup, there is a concomitant power loss from the induction coil 44.

A ferromagnetic material which presents a unique solution to the above eddy current losses encapsulates small iron particles in a resinous binder matrix so that they are isolated one from another and do not have a current flow therebetween. The iron particles may be made by any of the many well known processes for iron powder production. Carbonyl processed iron and water-atomized iron powders have been used with good results. Several grades of carbonyl processed iron have been used in magnetic layer 70: (1) the 0.18% carbon grade—a particle size of 8 microns average; (2) the 0.05% maximum carbon content grade—an average particle size of 20 microns; and (3) a second type having approximately 0.05% carbon content and having a 0.8 micron average diameter. Generally the second grade of this carbonyl powder is preferred.

The resinous material which may be used as a binding matrix may be either a thermoplastic or a thermosetting material. Therewith, poly (methylmethacrylate) may be used under carefully controlled mixing conditions or a thermoset polyester resin formed from an unsaturated polyester backbone which is cross-linked through the unsaturated links by a monomer such as styrene, may be employed.

The iron powder and the resinous binder may be blended together at an elevated temperature and then cast in a casting mold in a 4 to 10 ton press. Likewise, useful shapes of this material may be fabricated by first blending together and then extruding through a die member. A high proportion of the ferromagnetic iron powder is employed with respect to the proportion of the binder material. Therewith, the proportion of the materials is from 1:5 to 1:20 parts by weight of the binder resin to the ferromagnetic iron powder.

A preferred ferromagnetic material for the construction of layer 70 is a water-atomized powdered iron marketed by Easton Company under the trademark "Sintrex-F." This material corresponds in description to the above water-atomized iron powder. A suitable resinous matrix binder is a polyester resin marketed by Cadillac Plastic Company under trade designation "MR37CX." Another ferromagnetic material which has been employed with considerable success is a mixture of a similar water-atomized iron powder marketed under designation "EZ–4600" by the Easton Company and having a particle size range of 7 to 50 microns. The ratio of polyester binder to iron for casting was 1:10.

The presence of the magnetic material layer in the close proximity to the converging V configuration of the edges or edge portions 26 and 28 of FIG. 1 has been found to greatly increase the efficiency of continuous tube welding by the radio-frequency welding apparatus shown. The use of this fluid cooled magnetic material impeder has been particularly effective when used in conjunction with aluminum strip material welding.

The presence of the ferromagnetic iron particles at the surface of the magnetic material layer which is contacted by water flowing in the upper flow channel defined by the magnetic layer and the top semi-cylindrical panel 64 does not present an uncontrollable corrosion problem.

The entire surface of the magnetic material layer may be covered over with an exterior coating of a water impermeable material such as the binder matrix in order to prevent contact with the water. Alternatively, precoated iron powders may be employed. Such powders are coated with a water impermeable polymer and are available in sizes of from 5 to 8 microns. These polymer coated iron particles have an iron content of 98%, a carbon content of 0.05%, an oxygen content of 0.3% and a nitrogen content of 0.05%, all by weight. The 8 micron particle size iron powder is marketed under trade designation "CQ-4" by Antara Chemical Company, while the 5 micron size particles are marketed under trade designation "GS-6" by the same organization.

All of the above particle sizes are small enough so that very limited eddy current flow exists within the individual particles when in the radio-frequency magnetic field. Hence, the radius fo such particles is smaller than the skin depth which, if great enough, would provide magnetic shielding. Hence, the small diameter of each individual, isolated, particle does not prevent a sufficient thickness to attenuate the magnetic field by shielding. Yet, due to the high weight proportion of the iron particles, the mass of ferromagnetic material is great enough to give a high magnetic permeability equivalence to the magnetic material layer 70. Due to the surrounding binding matrix, a high resistance to current flow is attained whereby eddy currents are not allowed to flow in a detrimental fashion.

Magnetic field intensity terminating and heat sink block 54 may be constructed of any common and chemically stable metal which will furnish shielding for radio-frequency magnetic fields. Copper and copper based alloys are preferred due to their high elecrical conductivity and their ability to be bonded to various materials and ability to be machined into intricate shapes such as the stepped connection shown in FIG. 4.

By providing for magnetic field intensity termination, the intensity component along the axis of the horn is terminated and the flux lines are deflected away from the surrounding material of horn 20. The magnetic field intensity component is prevented from penetrating the material of horn 20 and, therewith, the undesired heating of the horn is avoided. The use of a metal of high electrical conductivity for block 54 provides electromagnetic shielding due to the generation of eddy currents by the changing magnetic flux. These eddy currents are of a direction such as to set up induced magnetic fields which compensate or oppose the change in magnetic flux; according to Lenz's law. Due to the low electrical resistance of such metals, these eddy currents are produced at or near the surface of block 54, particularly at the high frequency of the RF coil and, hence, provide practically complete shielding for the material of the forming horn 20. The presence of the magnetic field intensity terminating block at the upstream end of the magnetic material layer 70 also prevents local overheating of the magnetic material layer at the upstream end whre it would otherwise abut and contact a substantial mass of the forming horn metal. The good thermoconductivity of the metals which are also good shielding materials aids in preventing this local over-heating condition.

The material from which the non-magnetic housing 52 may be constructed can be any stable thermoplastic or thermosetting resin, such as poly (methylmethacrylate) or castable polyester resins. Poly (methylmethacrylate) under trade designations "Lucite" and "Plexiglas" are preferred. These polymers are non-magnetic in that they exhibit no gross magnetism when in a magnetic field. Consequently, they do not alter the impedance of the current flow paths in the tubular positioned strip material 3 and do not generate heat as do both the magnetic material layer 70 and the magnetic field intensity terminating and heat sink block 54. These resins or polymers present ease of manufacturing complex shapes by either casting or machining and may also be bonded to other materials, such as the magnetic material of layer 70 or the metal block 54 with conventional water insoluble resins and glues. The term "non-magnetic" as employed in the present specification and claims is intended to denote an antiferromagnetic material such as the described materials.

Another material from which magnetic material layer 70 and individual elements 74 may be made is a sintered magnetic ferrite material which is available in the present market. Such ceramic is manufactured by heating to a sintering temperature a mixture of ferrous ferrite or magnetite, $Fe_3O_4$, and other metallic oxides in minor proportions which improve the magnetic properties of the magnetite. A general employment is of transition metal oxides of the general formula MeO. Thin rectangular elements of such material have been illustrated in FIGS. 2–5 for the magnetic material layer of those figures. This material has high volume resistivity and, hence, is useful as an impeder material. However, its machinability is such that it is only difficultly formed into intricate shapes and even in the originally unmachined form, does not have sufficient mechanical strength for many employments.

Referring now to FIG. 6, an impeder device 100 of the same general configuration as impeder device 50 of FIG. 1, is shown. Impeder device 100 may be substituted in the recess 48 of forming horn 20 for impeder 50 of FIG. 1. This impeder device 100 is a simplified modification of impeder device 50, which simplification has been made possible by reason of the discovery of the novel impeder material of the present invention.

A fluid cooled support member 102 (shown by dotted lines) is provided for magnetic material layer 104 which is semi-cylindrical in shape and has a configured downstream end portion 106. Magnetic material layer 104 may be glued or otherwise secured to support member 102. A magnetic field intensity terminating and a heat sink block 108 is attached to the upstream end of support member 102 and has fluid ports 110 and 112 extending therethrough for communication with a continuous fluid channel cut in the fluid cooled support member 102.

FIG. 7 shows the fluid entry port 110 and its associated fluid channel 114 as well as the return fluid channel 116 and its associated fluid port 112. The undersurface of fluid cooled support member 102 and the horizontal bottom portions 118 and 120 of magnetic material layer 104 are configured for conforming to a recess such as recess 48 of FIG. 1.

FIG. 8 shows the fluid port and fluid channels through which the fluid coolant flows for cooling the magnetic material layer 104 and the associated fluid cooled support member 102. Fluid is forced into fluid port 110 and into a first channel 114 (flow shown by dotted arrow) and downstream to end wall 122 which has an anvil overhang 124 affixed thereto. The fluid then flows around partition 126 and back along fluid channel 116 to exit port 112, as shown in FIGS. 6 and 7. Openings 128 and 130 are provided at both ends of partition 126, as shown. The upstream opening 128 does not allow significant fluid passage due to the fact that the lower fluid resistance is through the fluid flow channels and opening 130 at the downstream end thereof, while the latter opening 130 does provide for such fluid flow.

Fluid cooled support member 102 has a magnetic field intensity terminator and heat sink block 108 affixed to the upstream end thereof and furnishes support for the fluid ports 110 and 112. Block 108 is in fluid-tight engagement with the upstream portions of support member 102. The magnetic material layer 104 is shown in overlying and conforming relation to support member 102 and may be bonded or secured thereto by glue or mechanical means.

A sealing ring 132 is provided for each of the fluid ports.

FIG. 9 shows magnetic material layer 104 removed from support member 102 and block 108. The downstream end of fluid cooled support member 102 has the bottom portion 134 tapered inwardly from angular connection 136 as well as having the horizontal side skirt 138 tapered upwardly from angular connection 136 to end panel 122. Anvil portion 124 can be seen affixed to end panel 122.

The downstream end 106 of magnetic material layer 104 is similarly configured in that the undersurface edges 140 on either side thereof are tapered upwardly from angular connection 142 to the main body end 144. An anvil portion 146 is provided for overlying anvil overhang 124 of the support member 102. By the configuring of impeder device 100, as shown in FIGS. 6–9, an impeder device of the same shape as that of FIGS. 1–5 is attained.

The greater simplicity of the modified impeder device of FIG. 6 is due in large part to the discovery of the novel magnetic material which allowed fabrication of magnetic material layer 104. This material is, mentioned above, as being a pressed mixture of iron powder in a resinous binder which has a high weight proportion of iron therein. The high volume of the iron present gives a high magnetic permeability equivalence to the material and, hence, enables its use in high frequency alternating magnetic field employments. The iron particles are individually isolated from one another so that eddy current loss or shielding loss is reduced to a minimum. The material has exceptional machinability, a machinability somewhat similar to cast iron, and does not present great rust or water corrosion problems. The material is dimensionally stable and, hence, may be employed in much the same manner as cast iron would be employed. In addition to these favorable properties, the material has a thermal conductivity sufficient to necessitate cooling only one surface thereof when in the thin cross-section semi-cylindrical shape of magnetic layer 104, as shown in FIGS. 6–9. Hence, a housing device allowing cooling on both sides is not necessitated by such material as is the ceramic ferrite material which may be employed as an alternative to the novel ferromagnetic material in impeder device 50 of FIGS. 1–5.

In order to manufacture the magnetic material layer 104 of FIGS. 6–9, a 4-inch cylinder was cast of a mixture of 600 grams of carbonyl processed powder (grade No. 2, above) and 72 grams of a thermosetting polyester backbone chain resin. The iron powder and the polyester together with the cross-linking component were stirred at an elevated temperature and then a catalyst for cross-linking the resin component was added. The material was then placed into a cylindrical mold form and pressed with a hydraulic press at 4 tons pressure. After a time sufficient for curing, of several hours, the cylindrical shape was removed. Tests demonstrated that the 4-inch length had a resistance of about 10,000 ohms and a permeability of 10. The cylindrical shape was then cut into a semi-cylinder and then a downstream end 106 formed thereon, as shown in FIG. 9. This forming was easily accomplished by machining with ordinary machining tools.

Another specific example is that of mixing 10 weight parts of a Sintrex F iron powder (described above) with a polyester resin (Cadillac Company) in the weight proportions of 10:1, respectively. After mixing the material and adding the catalyst, a press operated from between 4 to 10 tons was used to form the cylindrical shape from which the magnetic material layer 104 was formed. A somewhat lower equivalent resistance was obtained from this sample.

A further example is described which is intended to seek an upper range for the ferromagnetic material to resinous binder ratio. Acoordingly, 20 weight parts of Sintrex F iron powder is mixed with the polyester resin (Cadillac Company) in the weight proportions of 20:1, respectively. The material is mixed and the catalyst added. The cylindrical shape is formed by a press operated with a pressure of from 4 to 10 tons. As expected, a somewhat lower equivalent resistance was obtained from this sample.

When uncoated Sintrex iron particles were mixed with a poly (methylmethacrylate) binder at an elevated temperature and cast into a cylindrical form, a high conductivity was found. The apparent reason is due to the lack of encapsulating the individual iron particles with the poly (methylmethacrylate) resin. To avoid contact of individual particles so that resistance is high which increases eddy current losses, the polymer coated iron particles are preferred.

A preferred modification of the magnetic material layer 104 is to form the cylindrical in a non-uniform cross-section whereby when the magnetic material layer 104 is cut therefrom, the top-most portion overlying the support member 102 has a thickness of approximately ⅜ inch, while the side portions overhanging the top portion of the support member 102 have a thickness of ¼ inch. It has been found that the greater amount of impeder material at the top portion where the edges or edge portions of the converging metal are closest tends to raise the impedance of all paths except those in the immediate proximity of the edge portions which then has the effect of channeling the current flow in the tubular form sheet material to these edge portions for heating the same to a welding temperature with minimum power expenditure.

The material of construction of support member 102 and associated block 108 may be of copper or a copper alloy. Generally, any common metal which serves as a shielding for RF magnetic fields is usable. The copper alloys are particularly advantageous due to their ease of machinability and the forming of water-tight seals therein by the use of low melting solders. The high thermal conductivity of copper alloys is extremely useful due to the fluid cooled employed of such materials according to the present invention.

The ferrimagnetic materials such as the sintered ceramic material employed for element 74 of FIGS. 2–5 have too low a thermal conductivity for employment as the magnetic material layer of FIGS. 6–9. It may not be adequately cooled from a single surface thereof even in thin cross-sections. The Curie temperature of such materials is approximately 180° C. and would be exceeded in portions of a magnetic material layer of ¼ inch thickness overlying a copper support base. This problem of cooling from a single side only is overcome by employment of the novel ferromagnetic material of the iron powder mixed with a low proportion of a binder resin due to the fact that it may be easily cooled. This ferromagnetic material has better thermal conductivity and a higher electrical conductivity than the presently employed ferromagnetic materials.

The construction of the magnetic material layer of the finely divided ferromagnetic iron particles together with a resinous binder material gives a high volume resistivity which effectively limits excessive eddy currents which would otherwise be induced as in presently employed impeder materials. If such eddy currents are able to flow within a magnetic material, additional heat results which then increases the cooling problem. The novel material of the present invention has a high magnetic permeability and, thus, allows a low reluctance path to be established for the magnetic flux field generated by induction coil 44. As this magnetic material layer has a Curie temperature above which the material becomes paramagnetic, its temperature must be below this critical point in order to produce the welding efficiency attainable by use of the present invention. This magnetic material layer of finely divided ferrogamnetic iron particles together with a resinous binder is not only characterized by a low electrical conductivity, but also possesses low thermal conductivity which then effectively limits the size and thickness of the material which may be used as an impeder. If the thickness of the impeder is not restricted, a heat build-up in the center of the impeder may result which may take the material in that region above the Curie temperature. However, such ferromagnetic materials exhibit a saturation flux density and, thus, a sufficient thickness must be employed to prevent saturation in the radio-frequency magnetic field.

In practice, forming horn 20 may be constructed of stainless steel, copper, aluminum or a resin material such as fiberglas-resin composites. The metallic materials tend to rise in temperature during welding to an equilibrium level and the heat generated thereby may adversely affect the permeability of any magnetic material associated therewith, by raising the same above its Curie point. The impeder device 50 or impeder device 100 of the instant invention effectively eliminates this problem by placing the magnetic field intensity terminating and heat sink blocks 54 and 108, respectively, between the magnetic material layers and the material of horn 20.

The coolant fluid for cooling the impeder device may be either water, oil or other conventional medium.

Impeder devices of the above type have been tested and found to increase the welding efficiency of welding lines without impeders several fold. Welding speeds of 400 feet per minute have been attained. For the manufacture of cylindrical food container bodies of five inches length, this welding speed amounts to 1,000 cans per minute which is above commercial rates of production in present technology. By increasing the fluid coolant flow rate and by increasing the cross-sectional area of the magnetic material layers of impeder devices 50 and 100, welding speeds between 400 to 2000 feet per minute are expected.

As the welding speed as above set out may be increased by enlarging the cross-sectional area of the magnetic material layer, the above welding speeds which are attainable with the proportions of cross-sectional area to length demonstrated by the drawings is not to be taken as a limitation of the present invention.

It is obvious that the illustrative practices are not restrictive; and that the invention may be practiced in many ways within the scope of the appended claimed subject matter. In particular, at low power levels wherein low voltage and current are supplied to the RF induction coil and at low welding speeds, no particular cooling means other than conduction cooling by the air moving along the tubular formed strip material and by conduction through the associated parts of the impeder device and forming horn need be provided.

What is claimed is:

1. In a radio-frequency welding apparatus for forming a tube having a heat generating device and a support and guiding horn having a size and shape in cross-section substantially the same as the internal size and shape of said tube over which opposite edges and edge portions of continuous strip material are positioned for welding one to another, the improvement comprising an impeder device at least partially housed in a recess in the support and guiding horn, said recess being located proximately and inwardly from the converging edges and edge portions of said strip material when positioned for welding, said impeder device having a magnetic material layer arranged in a surface conforming to the curved surface formed by the strip material when positioned for welding and a support means having a curved surface for supporting said magnetic material layer, said magnetic material layer formed from a material exhibiting gross magnetism in a magnetic field, and said magnetic material layer positioned between the curved surface formed by the strip material and the recess in said support and guiding horn and having a portion thereof located inwardly from the converging edges and edge portions of the strip material when positioned for welding.

2. The improvement in a radio-frequency welding apparatus of claim 1, in which said magnetic material layer comprises a mixture of particulated ferromagnetic material and a resinous binder in the weight range of 5:1 to 20:1, respectively.

3. The improvement in a radio-frequency welding apparatus of claim 1 in which said magnetic material layer is composed of a sintered ferromagnetic oxide material.

4. The improvement in a radio-frequency welding apparatus of claim 1 in which said impeder device has a magnetic field intensity terminator and heat sink block affixed to the upstream end of said magnetic material layer and positioned between the curved surface formed by the strip material and the recess in said horn.

5. The improvement in a radio-frequency welding apparatus of claim 1 wherein said impeder device has a cooling means comprising a curved fluid flow channel positioned between said magnetic material layer and said curved surface formed by the strip material, and a second channel located immediately inwardly of said support means for allowing flow of a coolant for removal of heat generated within said layer.

6. The improvement in a radio-frequency welding apparatus of claim 1 wherein said impeder device has a cooling means comprising a fluid flow channel within said support means for extracting heat generated within said layer from the contacting extended area of said magnetic material layer.

7. In a radio-frequency welding apparatus having a heat generating means and a horn over which opposite edges and edge portions of continuous strip material are positioned for welding one to another and having a recess therein, the improvement comprising a fluid-cooled impeder device at least partially housed in the recess in said horn, said impeder device having a magnetic material layer arranged in a surface conforming to the curved surface formed by the strip material when positioned for welding and having a portion located directly inwardly from the converging edges and edge portions of the strip material, a housing of a non-magnetic material enclosing said layer, a magnetic field intensity terminator and heat sink block affixed to the upstream end of said housing and in fluid-tight engagement therewith, a support means for supporting said magnetic material layer arranged within said housing and spaced from the outermost and innermost portions thereof, said housing and said magnetic field intensity terminator and heat sink block having innermost portions configured to fit the recess in the horn and outermost portions configured arcuately and conforming to the curved plane formed by the strip material when positioned for welding, a first fluid flow channel between the innermost portion of said housing and said support means, a second fluid flow channel between the outermost of said magnetic material layer and the outermost portion of said housing, at least one further fluid flow channel connecting said first and second channels at the downstream end of said housing, and first and second fluid ports extending through said magnetic field intensity terminator and heat sink block for communicating with said first and second fluid flow channels, respectively.

8. The improvement in a radio-frequency welding apparatus of claim 7 in which said magnetic material layer comprises a mixture of particulated ferromagnetic material and a resinous binder in the weight range of 5:1 to 20:1, respectively.

9. The improvement in a radio-frequency welding apparatus of claim 7 in which said magnetic material layer is composed of a sintered ferromagnetic oxide material.

10. The improvement in a radio-frequency welding apparatus of claim 7 in which said magnetic material layer comprises a plurality of elements composed of a sintered ferromagnetic oxide material.

11. In a radio-frequency welding apparatus having a heat generating device and a horn over which opposite edges and edge portions of continuous strip material are positioned for welding one to another and having a recess therein, the improvement comprising a fluid cooled impeder device at least partially housed in the recess in said horn, said impeder device having a magnetic material layer arranged in a surface conforming to the curved surface formed by the strip material when positioned for welding and having a portion directly radially inward with respect to the converging edges and edge portions of the strip material, said magnetic layer composed of a mixture of a major portion of a particulated ferromagnetic material and a minor portion of a resinous binder, a fluid-cooled support means for said magnetic material layer having an internal fluid flow channel connected to first and second ports whereby a coolant may be circulated through the interior of said support means for cooling the same and the supported magnetic material layer, a magnetic field intensity terminator and heat sink block attached to the upstream end of said support means and furnishing an abutment surface for the upstream end of said magnetic material layer, said impeder device positioned between the curved surface formed by the strip material when positioned for welding and the recess in said horn.

12. A radio-frequency welding apparatus for forming a tube, having means to feed strip material for welding and having a support and guiding horn having a size and shape in cross-section substantially the same as the internal size and shape of said tube about which the strip material may be fed to position opposite edges and edge portions thereof for welding one to another and having forging rolls for forming a line of weld, comprising a radio-frequency current heating means for heating at least the edges of the strip material to welding temperature, an impeder device at least partially housed in a recess in said support and guiding horn, said recess being located inwardly and proximately from the converging edges and edge portions of the strip material when positioned for welding, said impeder having a magnetic material layer arranged in a surface conforming to the surface formed by the strip material when positioned for welding and a support means having a surface for supporting said magnetic material layer, said magnetic material layer formed from a material exhibiting gross magnetism in a magnetic field, and said magnetic material layer positioned between the surface formed by the strip material and the recess in said horn and having a portion thereof inwardly located with respect to the converging edges and edge portions of the strip material when positioned for welding.

13. The radio-frequency welding apparatus of claim 12 in which said magnetic material layer consists of a mixture of particulated ferromagnetic material and a resinous binder in the weight range of 5:1 to 20:1, respectively.

14. The apparatus of claim 12 in which said magnetic material layer is composed of a sintered ferrimagnetic oxide material.

15. The apparatus of claim 12 in which said impeder device has a magnetic intensity terminator and heat sink block affixed to the upstream end of said magnetic material layer and positioned between the curved surface formed by the strip material and the recess in said horn.

16. The apparatus of claim 12 in which said impeder device has a cooling means comprising a fluid flow channel for allowing flow of a coolant for removal of heat generated within said magnetic material layer.

17. A radio-frequency welding apparatus having means to feed strip material for welding and having a horn about which the strip material may be fed to position opposite edges and edge portions thereof for welding one to another and having forging rolls for forming a line of weld comprising, a radio-frequency current heating means for heating at least the edges of the strip material to welding temperature, an impeder device at least partially housed in a recess in said horn, said impeder device having a magnetic material layer arranged in a surface conforming to the curved surface formed by the strip material when positioned for welding and having a portion directly inwardly located with respect to the converging edges and edge portions of the strip material, said magnetic material layer formed from a material exhibiting gross magnetism in a magnetic field, a housing of a non-magnetic material enclosing said layer, a magnetic field intensity terminator and heat sink block affixed to the upstream end of said housing and in fluid-tight engagement therewith, a support means for supporting said magnetic material layer arranged within said housing and spaced from the outermost and innermost portions thereof, said housing and said magnetic field intensity terminator and heat sink block having innermost portions configured to fit the recess in the horn and outermost portions configured arcuately and conforming to the curved plane formed by the strip material when positioned for welding, a first fluid flow channel between the innermost portions of said housing and said support means, a second fluid flow channel between the outermost surface of said magnetic material layer and the outermost portion of said housing, at least one further fluid flow channel connecting said first and second channels at the downstream end of said housing, and first and second fluid ports extending through said magnetic field intensity terminator and heat sink block for communicating with said first and second fluid flow channels, respectively.

18. The apparatus of claim 17 in which said magnetic material layer comprises a mixture of particulated ferromagnetic material and a resinous binder in the weight range of 5:1 to 20:1, respectively.

19. The apparatus of claim 17 in which said magnetic material layer is composed of a sintered ferrimagnetic oxide material.

20. A radio-frequency welding apparatus having means to feed strip material for welding and having a horn about which the strip material may be fed to position opposite edges and edge portions thereof for welding and having forging rolls for forming a line of weld, comprising a radio-frequency current heating means for heating at least the edges of the strip material to welding temperature, an impeder device at least partially housed in a recess in said horn, said impeder device having a magnetic material layer arranged in a surface conforming to the curved surface formed by the strip material when positioned for welding and having a portion positioned directly inwardly with respect to the converging edges and edge portions of the strip material, said magnetic material layer composed of a mixture of a major portion of a particulated ferromagnetic material and a minor portion of a resinous binder, a fluid-cooled support means for said magnetic material layer having an internal fluid flow channel connected to first and second ports whereby a coolant may be circulated through the interior of said support means for cooling the same and the supported magnetic material layer, said support means having a magnetic field intensity terminator and heat sink block attached to the upstream end thereof and furnishing an abutment support for the upstream end of said magnetic material layer, said impeder device positioned between the curved surface formed by the strip material when positioned for welding and the recess in said horn.

21. The apparatus of claim 20 in which said magnetic field intensity terminating and heat sink block is constructed of a material having high electrical and thermal conductivities.

22. The apparatus of claim 17 in which said radio-frequency current heating means is an induction coil wound about said horn and spaced therefrom.

23. The apparatus of claim 20 in which said radio-frequency current heating means is an induction coil wound about said horn and spaced therefrom.

24. The improvement in the radio-frequency welding apparatus of claim 1 wherein a magnetic field intensity terminator and heat sink block is connected to one end of the impeder device, said terminator block adapted to be fluid cooled for the removal of heat generated therewithin, and said terminator block constructed of a material having a low magnetic permeability and high thermal and electrical conductivities.

25. The improvement in a radio-frequency welding apparatus of claim 24 in which said terminator block is constructed of a copper alloy having a high copper content.

26. The improvement in a radio-frequency welding apparatus of claim 24 in which said terminator block is positioned at the upstream end of said impeder member.

27. The improvement in the radio-frequency welding apparatus of claim 1 wherein a base is connected to the upstream end of said impeder device, said base being formed from a fluid-cooled magnetic field intensity terminating and heat sink material, said material having high thermal and electrical conductivities and low magnetic permeability, and said base being positioned upstream from the closest edge of said heat generating device.

28. The improvement in a radio-frequency welding apparatus of claim 27 in which said base is constructed of a copper alloy having a high copper content.

29. The radio-frequency welding apparatus of claim 12 wherein said support means comprises a body portion received in said recess and defining said curved supporting surface as being of limited circumferential extent positioned inwardly with respect to the converging edges and edge portions of the strip material, said magnetic material layer being supported on said curved supporting surface intermediate said body portion and the converging edges and edge portions of the strip and extending along the limited circumferential extent of the supporting surface and less than fully about the interior surface of the strip, said body member including fluid passages for directing fluid therethrough in cooling relation to the magnetic layer.

30. A radio-frequency welding apparatus having a means to feed strip material for welding and having a horn about which the strip material may be fed to position opposite edges and edge portions thereof for welding one to another and having forging rolls for forming a line of weld, comprising a radio-frequency current heating means for heating at least the edges of the strip material to welding temperature, an impeder device at least partially housed in a recess in said horn, said impeder having a magnetic material layer arranged in a surface conforming to the surface formed by the strip material when positioned for welding and a support means for said magnetic material layer, said magnetic material layer formed from a material exhibiting gross magnetism in a magnetic field, said magnetic material layer positioned between the curved surface formed by the strip material and the recess in said horn and having a portion thereof inwardly located with respect to the converging edges and edge portions of the strip material, and wherein said support means comprises a body portion received in said recess and defining a supporting surface of limited circumferential extent positioned inwardly with respect to the converging edges and edge portions of the strip material, said magnetic material layer being supported on said supporting surface intermediate said body portion and the converging edges and edge portions of the strip and extending along the limited circumferential extent of the supporting surface and less than fully about the interior surface of the strip, said body member including fluid passages for directing fluid therethrough in cooling relation to the magnetic layer.

31. The radio-frequency welding apparatus of claim 30 wherein said body portion further includes a cover portion intermediate the magnetic layer and the edges and edge portions of the strip, said cover member being spaced from the magnetic layer to define a further fluid passage intermediate the cover member and the magnetic layer, said further fluid passage being in fluid communication with said fluid passage in said body member for providing the passage of coolant fluid through said body member below and above the magnetic layer and closely proximate thereto.

32. The radio-frequency welding apparatus of claim 30 wherein said supporting surface comprises the outermost portion of said support means, said magnetic layer having an inner surface conforming to said supporting surface and resting thereon and said magnetic layer being continuous along its circumferential extent and having an outer surface conforming to the interior surface of said strip at said edges and edge portions and being, along the longitudinal extent of the magnetic layer, closer to said edges and edge portions than any further portion of said impeder, said fluid passage being disposed inwardly of said magnetic layer in said body portion for dissipating heat from said magnetic layer through said inner surface thereof.

References Cited

UNITED STATES PATENTS

| | | | |
|---|---|---|---|
| 2,744,040 | 5/1956 | Altmann | 252—62.54 X |
| 2,833,910 | 5/1958 | Stanton et al. | 219—59 |
| 3,028,469 | 4/1962 | Bognar | 219—59 X |
| 3,031,554 | 4/1962 | Jackson | 219—8.5 X |
| 3,117,092 | 1/1964 | Parker | 252—62.54 |
| 3,242,299 | 3/1966 | Laughlin et al. | 219—8.5 |
| 3,379,853 | 4/1968 | Domizi | 219—59 X |
| 2,933,582 | 4/1960 | Tower | 219—59 X |
| 3,004,134 | 8/1961 | Allardt | 219—59 |
| 3,209,115 | 9/1965 | Van Iperen | 219—59 |
| 3,270,176 | 8/1966 | O'Neill et al. | 219—59 X |

JOSEPH V. TRUHE, Primary Examiner

J. G. SMITH, Assistant Examiner

U.S. Cl. X.R.

219—59